(12) United States Patent
Stockebrand et al.

(10) Patent No.: US 9,126,466 B1
(45) Date of Patent: Sep. 8, 2015

(54) SUPPORT PLATE FOR TRAILER HITCH ASSEMBLY

(71) Applicant: B & W Custom Truck Beds, Inc., Humboldt, KS (US)

(72) Inventors: Cleaton E. Stockebrand, Savonburg, KS (US); Larry Sorenson, Yates Center, KS (US)

(73) Assignee: B & W CUSTOM TRUCK BEDS, INC., Humboldt, KS (US)

( * ) Notice: Subject to any disclaimer, the term of this patent is extended or adjusted under 35 U.S.C. 154(b) by 0 days.

(21) Appl. No.: 14/338,455

(22) Filed: Jul. 23, 2014

(51) Int. Cl.
*B60D 1/48* (2006.01)
*B60D 1/01* (2006.01)
*B62D 53/08* (2006.01)

(52) U.S. Cl.
CPC ........ *B60D 1/48* (2013.01); *B60D 1/015* (2013.01); *B62D 53/0828* (2013.01)

(58) Field of Classification Search
CPC ............ B62D 53/0828; B62D 53/0807; Y10S 280/901
See application file for complete search history.

(56) References Cited

U.S. PATENT DOCUMENTS

| | | | |
|---|---|---|---|
| 2,402,254 A * | 6/1946 | Maddock et al. | 384/421 |
| 3,170,716 A * | 2/1965 | Walther et al. | 280/407 |
| 3,826,516 A | 7/1974 | Weber | |
| 4,921,266 A * | 5/1990 | Beals | 280/415.1 |
| 4,960,288 A | 10/1990 | Chambers | |
| 5,513,869 A | 5/1996 | Putnam | |
| 5,575,491 A * | 11/1996 | Fenton | 280/417.1 |
| 5,772,229 A | 6/1998 | Cattau | |
| 5,839,745 A * | 11/1998 | Cattau et al. | 280/434 |
| 5,992,915 A * | 11/1999 | Thompson et al. | 296/39.2 |
| 6,065,766 A | 5/2000 | Pulliam | |
| 6,170,850 B1 | 1/2001 | Works | |
| 6,308,977 B1 | 10/2001 | Pulliam et al. | |
| 6,851,695 B2 * | 2/2005 | Lindenman et al. | 280/441 |
| 6,935,650 B2 | 8/2005 | Grinde et al. | |
| 7,584,982 B2 | 9/2009 | Fisher | |
| 7,988,177 B2 | 8/2011 | Colibert et al. | |
| 8,556,287 B1 | 10/2013 | Connell | |
| 2007/0108728 A1 | 5/2007 | Germann et al. | |
| 2010/0044997 A1* | 2/2010 | Burns et al. | 280/434 |
| 2012/0145851 A1 | 6/2012 | McCoy | |
| 2013/0200593 A1 | 8/2013 | McCoy et al. | |
| 2013/0300087 A1 | 11/2013 | Hausler et al. | |

FOREIGN PATENT DOCUMENTS

DE          2537929 A  *  3/1977

* cited by examiner

*Primary Examiner* — Kevin Hurley
(74) *Attorney, Agent, or Firm* — Erickson Kernell Derusseau & Kleypas, LLC

(57) ABSTRACT

The present invention is directed to a support plate for a trailer hitch. The plate has an upper surface adapted to receive at least a portion of a base of a trailer hitch assembly thereon and a lower surface adapted to rest on a loading surface of a pickup truck. The plate may have a longitudinal trough formed therein and the trough may be sized to fit between ridges formed in the loading surface. The invention is designed to transfer downward forces from the trailer hitch assembly to the areas of the truck bed between the ridges to help prevent the hitch assembly from smashing or denting the ridges.

13 Claims, 2 Drawing Sheets

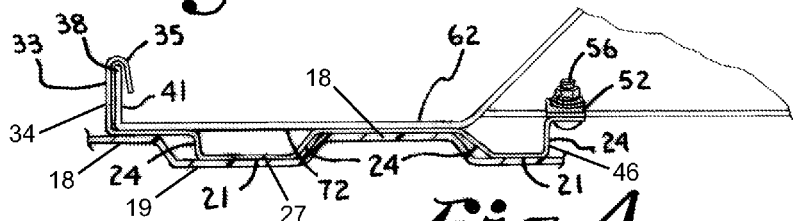
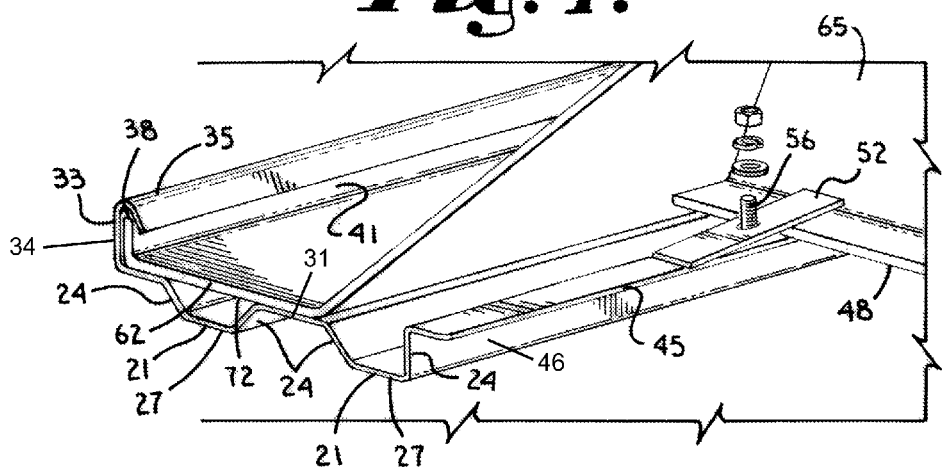
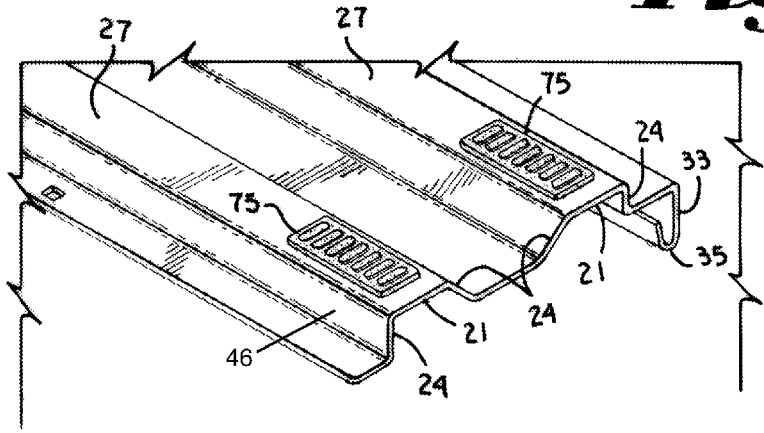

SUPPORT PLATE FOR TRAILER HITCH ASSEMBLY

BACKGROUND OF THE INVENTION

1. Field of the Invention

This invention relates to support structures for trailer hitch assemblies. More specifically, support structures located between fifth wheel hitch assemblies and pickup truck beds.

2. Background & Description of the Related Art

Fifth wheel trailer hitches are a popular means for towing large items such as campers or livestock trailers. The hitches comprise a receiver assembly mounted on the towing vehicle and a pin mounted on the item being towed. The receiver assembly includes a horseshoe shaped top plate attached to a base. The pin and receiver are coupled together by locking the pin in the center of the top plate in preparation for towing.

Fifth wheel hitches are often added to pickup trucks because the hitches are versatile and easy to use. There are a number of ways the hitches can be installed, but the hitch receiver assembly is almost always located in the bed of the truck. Some hitch assemblies are fixedly mounted by bolting or welding the entire assembly to the bed. Others are mounted on rails to allow horizontal movement. The type of fifth wheel assembly that is most relevant to the present invention comprises a downwardly extending post in the center of the assembly which connects to the truck frame. The post extends through the truck bed into a receiver mounted to the truck frame below the bed. This central post hitch assembly has two bases or feet that rest on the surface of the truck bed when the hitch is in use. The feet may exert substantial downward forces on the loading surface of the bed when the hitch is in use, which may cause noticeable damage to the bed below the feet. The damage usually consists of denting and smashing the raised areas or ridges in the bed. Such damage can lead to rust and corrosion because the paint cracks and chips at the damaged locations allowing moisture to affect the bare metal. Also, a damaged truck bed detracts from the aesthetics of the vehicle.

What is needed in the trailer hitch industry is a support that can be placed under the feet of a fifth wheel hitch assembly to protect the truck bed from damage. As described below, the present invention addresses this need.

SUMMARY OF THE INVENTION

The present invention comprises a support apparatus for a trailer hitch assembly. The trailer hitch assembly is typically supported on the loading surface of a truck bed and has at least one foot or base plate. The loading surface usually has a plurality of ridges and troughs formed therein. The support apparatus comprises a plate for supporting the hitch assembly. The support plate has an upper surface adapted to receive at least a portion of a base of a trailer hitch assembly thereon and a lower surface adapted to rest on a loading surface of a pickup truck.

The support plate may have a longitudinal trough formed therein and the trough may be sized to fit in a trough formed between ridges formed in the loading surface. The invention may include a hook to engage a lip on the trailer hitch assembly, and a strap or tab for securing the support plate to the hitch assembly. The hook may have a shank projecting upward from the plate and a downwardly turned catch. The strap may be adapted to clamp a portion of the hitch assembly between the strap and a flange on the support plate. The invention may also have an alignment panel extending upwardly from the plate that fits in a void formed in the trailer hitch assembly to help ensure the plate is properly aligned with the hitch assembly.

BRIEF DESCRIPTION OF THE DRAWINGS

FIG. 3 is a cross-sectional view of the hitch assembly taken along line 3-3 of FIG. 1.

FIG. 4 is an enlarged fragmentary, exploded view of a locking strap securing a support plate to a hitch assembly.

FIG. 5 is an enlarged fragmentary view of a non-marring wear pad on the bottom of a support plate.

DETAILED DESCRIPTION OF THE PREFERRED EMBODIMENTS

Figure 1:
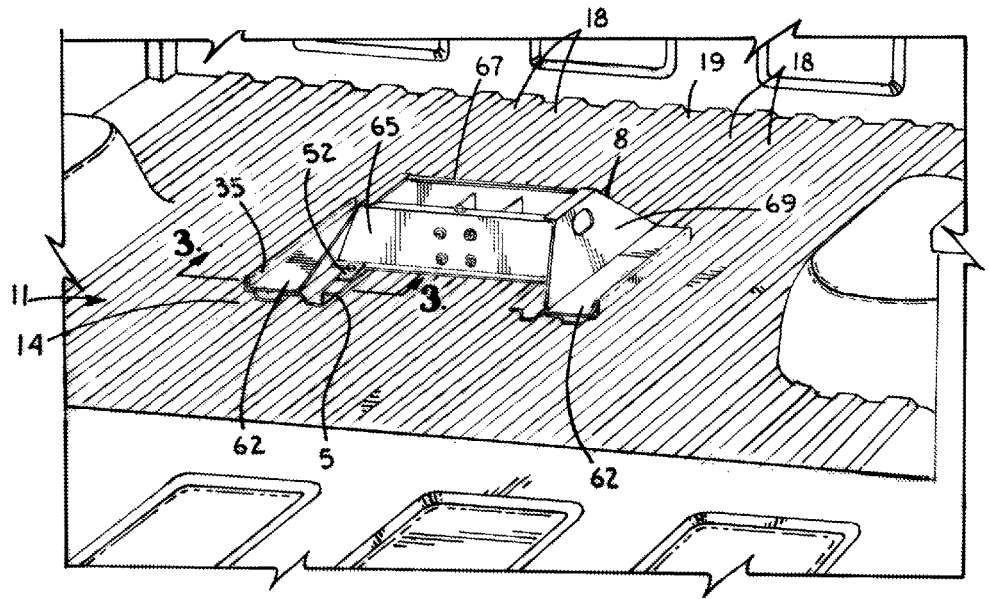
FIG. 1 is a perspective view of a fifth wheel hitch assembly installed in the bed of a pickup with support plates installed below each foot of the assembly.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," "leftwardly," "upper," and "lower" will refer to the installed position (as shown in the drawings) of the item to which the reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 2:
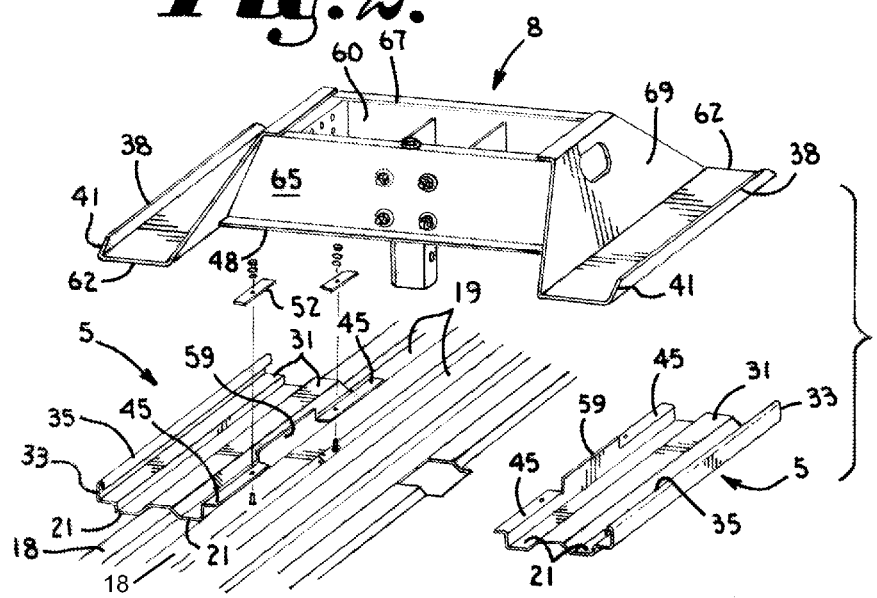
FIG. 2 is an exploded perspective view of the hitch assembly and support plates in FIG. 1.

Referring to the drawings in more detail, a support plate or shoe 5 is shown for supporting a trailer hitch assembly 8 in the bed 11 of a pickup truck. Referring to FIGS. 1 and 2, support plate 5 is positioned between hitch assembly 8 and the loading surface 14 of bed 11. The loading surface 14 is typically formed from corrugated sheet metal with a plurality of ridges 18 and troughs 19 running longitudinally relative to the bed 11. The support plate 5 helps protect the loading surface 14 by reducing the likelihood that the ridges 18 in the loading surface will be damaged by the hitch assembly 8. The ridges 18 are generally not supported by the pickup truck frame, which makes them particularly susceptible to damage from the downward forces of the hitch assembly 8. The present invention helps transfer the potentially damaging forces away from the ridges 18 to other portions of the truck bed 11 which are less likely to be damaged by such forces. The invention also causes the forces exerted by the hitch assembly 8 to be spread out over a large surface area thus lessening the impact of the forces.

Support plate 5 is generally rectangular and constructed from a durable and robust material such as steel. Plate 5 has a plurality of valleys or troughs 21 and at least one longitudinal plateau or ridge 31 running the length of the plate. Each trough 21 has a trapezoidal cross section comprising at least one wall 24 angled inward toward the bottom 27 of the trough 21. A trough 21 may have two walls 24 that angle inward toward the bottom 27 as shown in FIG. 4, or one vertical wall 24 and one angled wall 24 as shown in FIGS. 1, 2, 3 and 5. It is foreseen that a trough 21 may have a cross section other than trapezoid, but it is believed that trapezoidal troughs work best because they closely approximate the shape of the space between ridges 18 in loading surface 14.

Each trough 21 has a depth that is greater than or equal to distance of the height of each ridge 18. In use, each trough 21 is positioned between two ridges 18 such that the trough bottom 27 rests in a trough 19 of bed 11 formed between the ridges 18 and preferably on an upper surface of the portion of the material forming trough 19. Because the troughs 21 in support plate 5 are at least as deep as each ridge 18 is high, when the troughs 21 are positioned between the ridges 18, the tops of ridges 31 of support plate 5 are resting on or extending above the ridges 18. This keeps the plate 5 and hitch assembly 8 from pressing down on the ridges 18. Accordingly, the downward forces exerted on support plate 5 are transferred to troughs 19 between ridges 18 rather than on the ridges themselves.

Support plate 5 must remain relatively rigid during use to prevent denting or bending ridges 18. The troughs 21 help to keep the plate rigid because the walls 24 of the troughs act as stiffeners along the length of the plate 5. The walls 24 stiffen and strengthen support plate 5 due in part to the differences between the area moments of inertia of the cross sections of the walls 24 and the horizontal planar portions of the plate. The cross sections of the walls 24 have a larger area moment of inertia than the cross sections of the horizontal surfaces of the plate with respect to a downward forces acting on the plate. The difference in area moments of inertia is primarily due to the vertical or partially vertical orientation of the walls 24 compared to the horizontal orientation of the rest of the plate 5.

Support plate 5 also includes a hook 33 running the length of the plate 5. Hook 33 includes a shank 34 extending upwardly from an edge of the plate. The top portion of the hook 33 is folded back over the support plate and downward to form a catch or barb 35 with a generally inverted "U" or "V" shape. Catch 35 is sized to receive upper edge 38 of a lip 41 on the hitch assembly 8 to help hold the support plate 5 on the hitch assembly. It is foreseen that one or more shorter hooks could be used instead of a single hook 33 running the length of support plate 5. It is also foreseen that support plate 5 could be used without a hook 33 if the plate is secured to hitch assembly 8 using other means.

Support plate 5 includes a mounting flange 45 formed on and projecting outward from an upper end of a sidewall 46 projecting upward from the edge of the plate 5 opposite hook 33. Flange 45 is elevated slightly above the tops of ridges 31 on plate 5. When support plate 5 is installed on hitch assembly 8 the mounting flange abuts a lip 48 on hitch assembly 8. Flange 45 supports one or more locking straps 52 which help to secure support plate 5 to hitch assembly 8. Each locking strap 52 is fastened to flange 45 using a threaded fastener 56 routed through the flange 45 and the strap and secured using a nut. As described in more detail below, strap 52 is tightened against flange 45 while the strap 52 overlaps lip 48 to clamp the lip 48 between the strap 52 and flange 45 thus securing plate 5 to hitch assembly 8. It is foreseen that plate 5 may be secured to lip 48 using other methods such as threaded clamps or latches. It is also foreseen that a locking strap 52 may be secured to flange 45 using a pin or rivet and the strap could be rotated to engage or disengage the strap with lip 48. Various configurations of flange 45 and locking strap 52 may be used. For example, support plate 5 may have a single flange 45 that runs the length of the plate or there may be one or more shorter flanges as shown in FIG. 2.

As shown in FIG. 2, support plate 5 may include an alignment panel 59. The alignment panel 59 extends upwardly from an edge of support plate 5 near flange 45. Alignment panel 59 is sized to fit within a void 60 in the hitch assembly 8 proximate lip 48. Void 60 is formed between the front wall 65, rear wall 67, and side wall 69 of hitch assembly 8. When alignment panel 59 is placed within void 60, the flanges 45 and straps 52 of support plate 5 are in proper alignment with lip 48. Because alignment panel 59 extends upwardly into void 60 in the interior portion of the hitch assembly 8, the support plate 5 is impeded from moving with respect to the hitch assembly 8 because the panel 59 catches on the walls of the assembly.

To use the support plate 5, the plate 5 is placed on a base plate or foot 62 of hitch assembly 8 before the assembly is mounted in truck bed 11. To secure plate 5 to the foot 62, the hook 33 is placed on upper edge 38 of lip 41 such that the upper edge 38 is ready to slide into catch 35. The support plate 5 is then rotated around the bottom of foot 62 until the upper edge 38 of the lip 41 is inserted in catch 35. Support plate 5 is positioned against the bottom of foot 62 so that the ridges 31 of plate 5 touch the bottom surface 72 of foot 62. Also, alignment panel 59 is placed within void 60.

The support plate 5 is then secured to the hitch assembly 8 using locking strap 52. The fastener 56 is tightened while the strap 52 overlaps lip 48 such that the lip 48 is clamped between the strap and flange 45. Typically, locking straps 52 are used on both the front and rear sides of the hitch assembly. As shown in FIG. 2, the straps 52 are located on opposite sides of the alignment pane 59 and clamp down on flanges 48 located on the front and rear of hitch assembly 8. For a typical hitch assembly, a support plate 5 is installed on each foot 62 of hitch assembly 8.

After securing support plates 5 to hitch assembly 8, the assembly is placed on the loading surface 14 of truck bed 11 and the assembly is secured. The support plates 5 are positioned on the loading surface 14 such that troughs 21 of plate 5 are located between ridges 18 of loading surface 14 preferably with the bottom 27 of trough 21 supported on an upper surface of the portion of the material forming trough 19. When hitch assembly 8 exerts downward forces, the support plate 5 transfers the forces away from the ridges 18 onto troughs 19 of loading surface 14 between the ridges. Support plate 5 may include non-marring pads 75 on the underside of troughs 21 to help protect loading surface 14 from damage from the plate 5. Pads 75 are preferably formed from a relatively softer material than the steel plate 5 and steel truck bed 11 to prevent marring of bed 11 and to increase friction between support plate 5 and loading surface 14 to minimize movement of the plate. Pads 75 may be formed from plastic, rubber or foam or other suitable materials.

Having thus described the invention, what is claimed as new and desired to be secured by this Patent is as follows:

1. A support apparatus for a trailer hitch assembly, the trailer hitch assembly having at least one base plate that is supported on a loading surface of the bed of a truck, the loading surface having a plurality of ridges and troughs formed therein, said support apparatus comprising:

a plate for supporting the trailer hitch assembly, said plate having an upper surface and a lower surface, said upper surface adapted to receive at least a portion of the trailer hitch assembly base plate thereon, said lower surface adapted to rest on the loading surface;

a trough formed in said plate, said trough in said plate sized to fit in a trough formed between two ridges formed in the loading surface; and an alignment panel sized to fit in a void formed in the trailer hitch assembly.

2. The support apparatus as in claim 1 wherein said alignment panel extends upward from said plate and is sized to be received within the void.

3. A support apparatus for a trailer hitch assembly, the trailer hitch assembly having at least one base plate that is supported on a loading surface of the bed of a truck, the loading surface having a plurality of ridges and troughs formed therein, said support apparatus comprising:

a plate for supporting the trailer hitch assembly, said plate having an upper surface and a lower surface, said upper surface adapted to receive at least a portion of the trailer hitch assembly base plate thereon, said lower surface adapted to rest on the loading surface;

a trough formed in said plate, said trough in said plate sized to fit in a trough formed between two ridges formed in the loading surface; and a hook for engaging a lip on the trailer hitch assembly base plate.

4. The support apparatus as in claim 3 in which said hook includes a shank projecting upward from said plate and a downwardly turned catch for engaging the lip on the trailer hitch assembly base plate.

5. The support apparatus as in claim 3 further comprising a locking strap fastened to a flange, said locking strap adapted to clamp a portion of the trailer hitch assembly between said locking strap and said flange.

6. The support apparatus as in claim 5 further comprising a non-marring pad mounted to said lower surface of said plate.

7. A support apparatus for a trailer hitch assembly, the trailer hitch assembly having at least one base plate that is supported on a loading surface of the bed of a truck, the loading surface having a plurality of ridges and troughs formed therein, said support apparatus comprising:

a plate for supporting the trailer hitch assembly, said plate having an upper surface and a lower surface, said upper surface adapted to receive at least a portion of the trailer hitch assembly base plate thereon, said lower surface adapted to rest on the loading surface;

a locking strap fastened to a flange, said locking strap adapted to clamp a portion of the trailer hitch assembly between said locking strap and said flange; and a hook for engaging a lip on the trailer hitch assembly base plate.

8. The support apparatus as in claim 7 further comprising an alignment panel sized to fit in a void formed in the trailer hitch assembly.

9. The support apparatus as in claim 7 further comprising a trough formed in said plate, said trough in said plate sized to fit in a trough formed between two ridges formed in the loading surface.

10. A support apparatus for a trailer hitch assembly, the trailer hitch assembly having at least one base plate that is supported on a loading surface of the bed of a truck, the loading surface having a plurality of ridges and troughs formed therein, said support apparatus comprising:

a plate for supporting the trailer hitch assembly, said plate having an upper surface and a lower surface, said upper surface adapted to receive at least a portion of the trailer hitch assembly base plate thereon, said lower surface adapted to rest on the loading surface;

a trough formed in said plate, said trough in said plate sized to fit in a trough formed between two ridges formed in the loading surface;

a locking strap fastened to a flange, said locking strap adapted to clamp a portion of the trailer hitch assembly between said locking strap and said flange to secure said plate to the trailer hitch assembly; and a hook for engaging a lip on the trailer hitch assembly base plate.

11. The support apparatus as in claim 10 further comprising an alignment panel sized to fit in a void formed in the trailer hitch assembly.

12. The support apparatus as in claim 11 wherein said alignment panel extends upward from said plate and is sized to be received within the void.

13. The support apparatus as in claim 12 further comprising a non-marring pad mounted to said lower surface of said plate.

* * * * *